United States Patent [19]

Iizuka

[11] Patent Number: 5,062,724

[45] Date of Patent: Nov. 5, 1991

[54] METHOD OF MAGNIFYING A BIT MAP FONT DATA IN A HORIZONTAL DIRECTION

[75] Inventor: Shinichi Iizuka, Kawasaki, Japan

[73] Assignee: Fujitsu Limited, Kawasaki, Japan

[21] Appl. No.: 302,390

[22] Filed: Jan. 27, 1989

[30] Foreign Application Priority Data

Jan. 29, 1988 [JP] Japan ................... 63-020823

[51] Int. Cl.⁵ ............................................. B41J 5/30
[52] U.S. Cl. ................................... 400/121; 340/728; 340/735
[58] Field of Search .................. 340/731, 735, 728; 400/121, 124, 74; 101/93.04, 93.05, 93.01

[56] References Cited

U.S. PATENT DOCUMENTS

| | | | |
|---|---|---|---|
| 4,119,383 | 10/1978 | Watanabe | 400/320 X |
| 4,344,079 | 8/1982 | Chambors | 346/140 PD |
| 4,629,342 | 12/1986 | Futaki | 400/121 |
| 4,632,579 | 12/1986 | Takano | 400/121 |

FOREIGN PATENT DOCUMENTS

| | | | |
|---|---|---|---|
| 0207788 | 1/1987 | European Pat. Off. | 400/121 |
| 2149165 | 6/1985 | United Kingdom | 400/121 |

OTHER PUBLICATIONS

*IBM Tech. Disc. Bulletin,* H. E. Berkebile, vol. 25, No. 10, Mar. 1983, "Draft-to-Text Font Conversion Algorithm", 400–121.

Primary Examiner—David A. Wiecking
Assistant Examiner—Steven S. Kelley
Attorney, Agent, or Firm—Staas & Halsey

[57] ABSTRACT

A method of magnifying bit map font data used in printing by a dot matrix printer, in a horizonal direction. In a first step, a number of successive "0's", in a portion of the original bit map font data, which portion represents a solid line in the horizontal direction, is reduced to not more than a predetermined number by replacing each of one or more of the "0's" in that portion with a "1", so that the number of successive "0's" in that portion is not more than the predetermined number of successive "0's".

3 Claims, 11 Drawing Sheets

Fig. 1
(PRIOR ART)
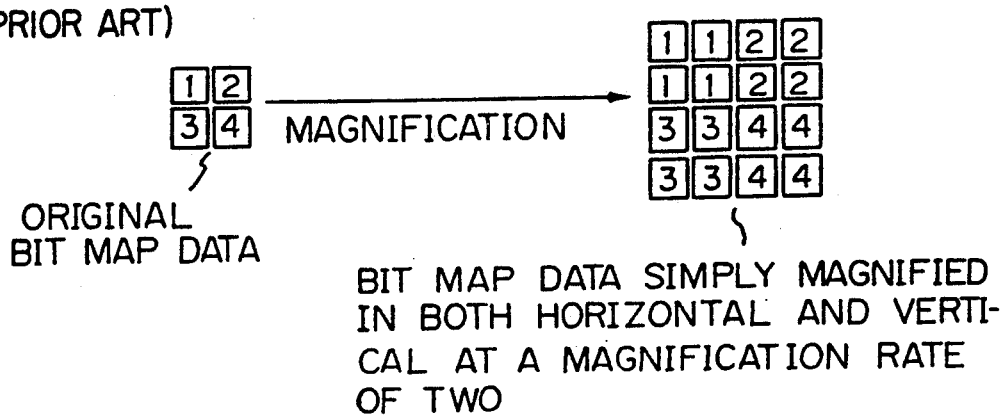
Fig. 2
(PRIOR ART)
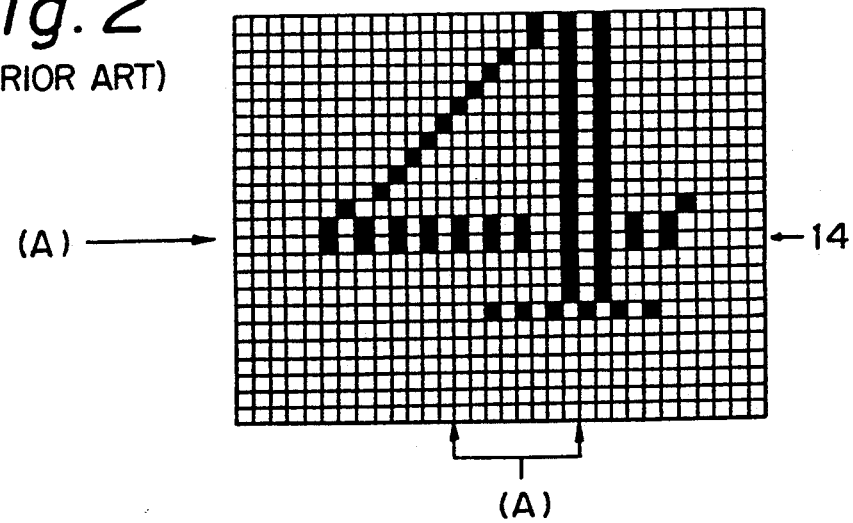
Fig. 10
(PRIOR ART)

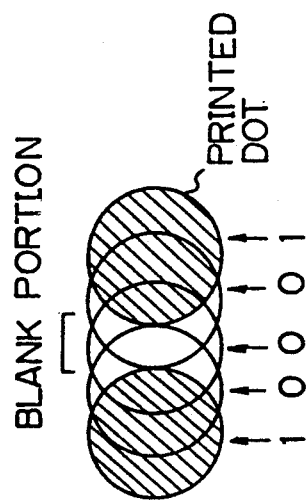
Fig. 8
(PRIOR ART)
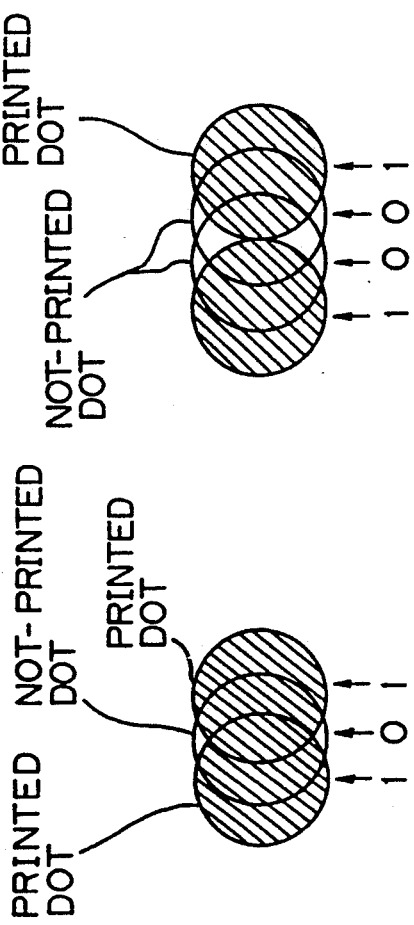
Fig. 7
(PRIOR ART)
Fig. 6
(PRIOR ART)

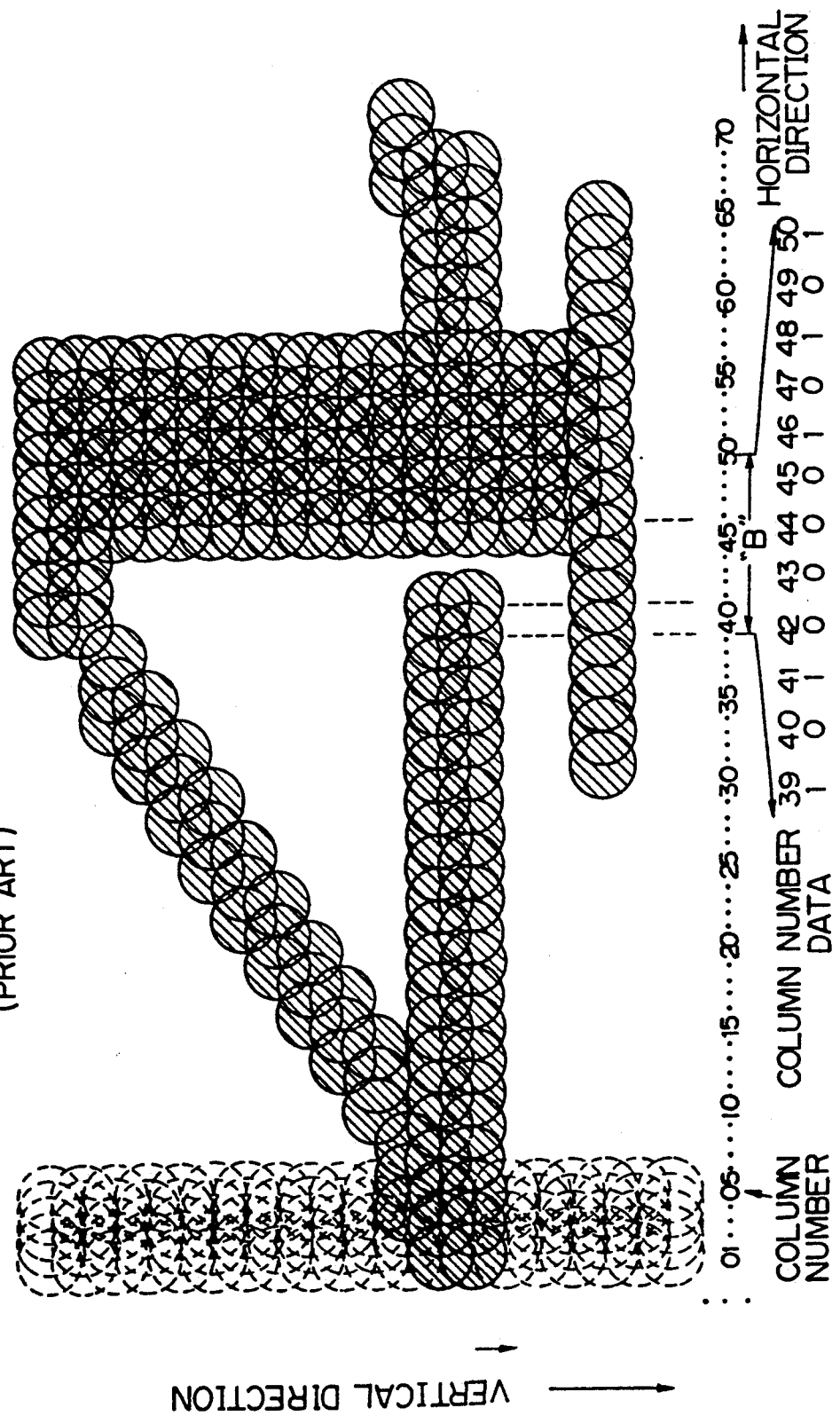

METHOD OF MAGNIFYING A BIT MAP FONT DATA IN A HORIZONTAL DIRECTION

BACKGROUND OF THE INVENTION

1. Field of the Invention

The present invention relates to a method of magnifying bit map font data in a horizontal direction, more particularly, it relates to a method of magnifying bit map font data suitable for half density printing, in a horiztontal direction and at a predetermined magnification rate, to obtain magnified bit map font data still sutiable for half density printing.

2. Description of the Related Art

Dot matrix printers, for example, twenty-four pin dot matrix printers, have a characteristic such that the quality of a printed character is high, and that various modifications of a character style are possible. One such modification is magnification of a character.

The simplest algorithm used for magnifying a character made of bit map data, in a horizontal/vertical direction, is a method of multiplying each bit in each of the horizontal/vertical directions by each magnification rate, e.g., at a magnification rate of two, as shown in FIG. 1.

The above method, however, is not applicable to the twenty-four pin printers currently in use, because they perform half density printing to improve the quality of the printed characters.

An example of bit map data modified for the half density printing is showing in FIG. 2. This a bit map font data for the number "4".

As shown in FIG. 2, in the bit map data modified for the half density printing, the number of bits provided is more than the minimum number of bits needed to recognize the character or number, and accordingly, because so many bits are provided to represent each character, the half density printing method can produce various types of character style, for example, Gothic style, Italic style, or even a cursive script style, in detail, and smoothly, with a good anesthetic appearance.

In the example of FIG. 2, when, for example, an oblique solid line which is a part of the construction of the number "4", is printed on a paper by a dot matrix printer, a high quality printing with a smooth outline (without noticeable nodes or snaking) can be obtained. FIG. 3 shows a simulated printed result of the bit map data of FIG. 2, wherein each circle filled with oblique lines shows a printed dot mark corresponding to one dot indicated by a black mesh in FIG. 2.

Another characteristic of the bit map data for the half density printing is that, as shown in FIG. 2, a "1" dot is not followed by a "1" dot in a series of bit data representing a solid line in the horizontal direction, and more than a predetermined number (for example, two in FIG. 2) of successive "0"s does not appear in the solid line, where "1" means print, and "0" means not print.

The reason why the solid line in the horiztontal direction in the bit map data for the half density printing is represented by a series of bit data as mentioned above, is related to the mechanism of the dot matrix printers and is explained as follows.

FIGS. 4 and 5 show an outline of the construction of a dot matrix printer. In FIGS. 4 and 5, reference numeral 11 denotes a platen, 12 denotes a paper, 22 denotes a printing heat, 21 denotes a carriage for the printing head, and 221-1, 221-2, . . . 221-4 denote twenty-four head pins (dot wires).

The twenty-four head pins (dot wires) 221-1, 221-2, . . . 221-24 are mounted in a portion 221 which protrudes toward the platen 11, in the printing head 22, and each of the head pins (dot wires) 221-1, 221-2, . . . 221-24 is moved toward the platen 11 by driving an exciting coil (not shown) provided to move each of the head pins 221-1, 221-2, . . . 221-24. A paper 12 and an ink ribbon (not shown) are set to intervene between the tops of the head pins 221-1, 221-2, . . . 221-24 and the surface of the platen 11. Accordingly, when a head pin 221-i is moved toward the platen 11, a dot portion of the ink ribbon, corresponding to the position of the moved head pin 221-i, is pressed on the paper 12 which is rolled on the platen 11, and therefore, a dot mark is printed on the paper 12.

The head pins 221-1, 221-2, . . . 221-24 are arranged in a row in the direction vertical to the axis of the platen 11, and parallel to a tangent line of a circumference of the platen 11, and thus, for example, a series of data in each column (each series of data in the vertical direction) of the bit map data of FIG. 2, can be printed on the paper 12 at one time.

Further, the carriage 21 mounting the printing head 22 is moved in the direction parallel to the axis of the platen 11 (hereinafter called horizontal direction). By moving the carriage 21 in the horizontal direction at an appropriate speed, each series of data in each column in a bit map font data (for example, each series of data in each column in the bit map font data as shown in FIG. 2) is printed on a paper 12, one column by one column.

Therefore, the speed of printing greatly depends on the speed at which the carriage 21 is moved, but this speed is limited by the time needed for each head pin 221-i to press a succeeding dot after pressing a preceding dot, i.e., a recovery time or cycle time of a piston motion of a head pin 221-i, when printing two dots in succession, driven by an exciting coil.

If a series of bit data representing a solid line in the horizontal direction includes successive "1's", where "1" means print, the carriage 21 moves in the horizontal direction at a sepped of less than one dot per T (sec), where T (sec) is the abovementioned cycle time of the piston motion of each head pin 221-i, but, if the above mentioned series of bit data, representing a solid line in the horizontal direction and including successive "1"s, is modified so that no successive "1"s are included in the series of bit data, the speed at which the carriage 21 is moved can be made faster than the speed of the carriage in the abovementioned case when including successive "1"s. For example, a series of bit data representing a solid line in the horizontal direction, are made to have a "1" on alternate dots, the moving speed of the carriage 21 can be made doubled compared with the abovementioned case including successive "1"s.

Moreover, the series of bit data representing a solid line in the horizontal direction in the bit map data shown in FIG. 2 includes two successive "0"s. These successive "0"s are provided for maintaining a length of the solid line represented mainly by the alternate dots, i.e., for making each end dot of the solid line "1". Generally, the lengthes of solid lines which are a part of a character must be maintained even after magnification, to maintain the character style.

FIGS. 6, 7 and 8 show examples of marks made by printed dots and not-printed dots respectively corresponding to different series of bit data, each under a common predetermined dimensional condition of the pitch of the dots in the horizontal direction and the diameter of the mark printed by the dot data "1", for example, the pitch of the dots is 1/360" and the diameter of the mark is 1/120" (about 0.2 mm). A printed dot is shown by a circle filled with oblique lines, and a not-printed dot is shown by a blank circle. The very large overlap of the circles indicating dots adjacent to each other, creates the smoothness of outlines of the printed character made by a series of dot marks.

The marks made by printed dots and a not-printed dot shown in FIG. 6, corresponds to a series of bit data "101", the marks made by printed dots and not-printed dots shown in FIG. 7, corresponds to a series of bit data "1001", and the marks made by printed dots and not-printed dots shown in FIG. 8, corresponds to a series of bit data "10001".

Under the abovementioned dimensional conditions, as shown in FIG. 6, a series of bit data consisting of successive "10's" appears as an almost smooth solid line, and as shown in FIG. 7, even a portion printed in accordance with the series of bit data "1001", appears to be connected. But, as shown in FIG. 8, a portion printed in accordance with the series of bit data "10001", appears to be disconnected, i.e., as having a blank portion.

This means that, under the above dimensional condition of the pitch of dots and the diameter of a printed mark, a series of bit data representing a solid line in the horizontal direction, which series of bit data dos not include more than two successive "0's", appears to be a solid line when printed.

Generally, depending on the dimensional conditions of the pitch of dots and the diameter of a printed mark, the maximum allowable number of successive "0's" in a series of bit data to represent to a solid line in the horizontal direction in a bit map font data for half density printing, will change. A general requirement for a series of bit data to represent a solid line in the horizontal direction in a bit map font data for half density printing, is that a "1" dot is not followed by a "1", and that more than a predetermined number of successive "0's" do not appear in the series of bit data, and a series of bit data representing a solid line in the horizontal direction must still satisfy the above requirement even after magnification in the horizontal direction.

Since the above requirement relates only to the magnification in the horizontal direction, a simple multiplication of each bit of an original bit map font data as shown in FIG. 1, can be applied to the magnification in the vertical direction.

FIG. 9 shows an example of a detailed process of carrying out a conventional method of magnifying a bit map font data for half density printing in the horizontal direction at a magnification rate of three. In the example of FIG. 9, a series of bit data in the horizontal direction, which is sampled from the portion shown by (A) in the bit map font data of FIG. 2, which is shown in FIG. 10, is used as an original series of bit data to be magnified in the horizontal direction.

In the conventional method of magnifying a bit map font data for half density printing in the horizontal direction shown in FIG. 9, at the first step, an intermediate magnification-stage magnified element is generated from each bit of the original series of bit data as follows: an original bit "1" generates h "10's" where h is a magnification rate; and an original bit "0" generates h "00's", when the magnification rate is three, an orignial bit "1" generates "101010"; and an original bit "0" generates "000000".

At the second step, the positions of columns for the intermediate-stage magnified element for each of the original "1's" and "0's" are arranged in the order in which the "1's" and "0's" are arranged in the original font data, and the positions of the two intermediate-stage magnified elements adjacent to each other are arranged with a difference of h columns.

At the third step, an OR logic of all bits in each of the columns, each of which bits is a component of the intermediate-stage magnified elements, and the positions of which bits have been arranged at the above second step, is calculated.

A general algorithm to obtain the value of each bit in the magnified series of bit data by the conventional method of magnifying a bit map font data for half density printing in the horizontal direction, which covers the abovementioned process of the magnification shown in FIG. 9, is shown in FIG. 11, using a flow chart. In FIG. 11, a column number of an original data is shown by "a", a column number of a magnified data is shown by "b", and a total number of columns consitituting the original bit map data is shown by "W".

At step 101 of FIG. 11, and initial setting of the column number of an original data is carried out as a=1.

At step 102 in FIG. 11, an initial setting of the column number of a magnified data is carried out as b=1.

At step 103 in FIG. 11, the conventional basic equation for writing a magnified data, for generating a magnified data, is applied.

At step 104 of FIG. 11, the column number of the magnified data is incremented by two.

At step 105 of FIG. 11, it is determined whether or not the original data is written h (the magnification rate, for example, three) times.

At step 106 of FIG. 11, the column number of the original data is incremented.

At step 107 of FIG. 11, it is determined whether or not the column number of the original data is smaller than or equal to W.

In the conventional basic equation for writing a magnified data for generating a magnified data, at step 103, to obtain a value (b) of each column b in the magnified series of bit data; a calculation of an OR logic of a value (a) of the corresponding column a in the original series of bit data, and the value (b) of the same column b obtained in the previous cycles, is carried out; and then a calculation is made of an AND logic of the result of the above OR logic calculation of each column b and the inverted value (b−1) of the one column before b−1 in the magnified bit map data.

The above OR logic calculation in step 103, corresponding to, for example, the operation at the third step in the aforementioned process of FIG. 9, means that the magnified bit map data obtained in all cycles in the process of FIG. 11 must be superposed, and the above AND logic calculation in the stop 103 means that a "1" dot must not be followed by a "1" dot (hereinafter called a successive "1's" inhibition rule).

At stps from 102 to 105, the values in alternate columns from the column number b=h(a−1)+1 to b=h(a+1)+1 in the magnified bit map data, are obtained for each column a of the original data, and in steps 101 to 107, the values in all columns (b) in the magnified bit map data corresponding to all columns a in the original bit map data, are obtained. In the process of FIG. 11, the values in the columns corresponding to the even-numbered columns in the aforementioned intermediate magnification-stage magnified element, for example, "0's" in the aforementioned h "0's" in FIG. 9, are not calculated, because these are always zero, and do not affect the result of the OR calculation.

Returning to FIG. 9, the result of the magnified bit map data of FIG. 9, includes more than two successive "0's", i.e., "0000". Under the aforementioned dimensional condition of the pitch of dots and the diameter of the printed dots, as understood by referring to FIG. 8, these successive "0's", i.e., "0000", generate a blank portion in a solid line when printed.

Namely, by the conventional method of magnification it is impossible to effectively prevent the appearance of a visible blank portion in the bit map data for half density printing, when magnified in the horizontal direction, and which should represent a solid line in the horizontal direction, when printed. Therefore, when a character constituted by a bit map font data for half density printing, is magnified in the horizontal direction by the conventional method of magnification, and printed, the original character style is sometimes damaged due to an appearance of a blank portion in a solid line in the horizontal direction, which solid line composes a part of the construction of the character.

SUMMARY OF THE INVENTION

The object of the present invention is to provide a method of magnifying a bit map font data for half density printing in the horizontal direction at a predetermined magnification rate, without generating a blank portion in a solid line in the horizitonal direction when printed after magnification.

According to the present invention, there is provided a method of magnifying a bit map font data in a horizontal direction comprising: a first step of reducing a number of successive "0's" in a portion which represents a solid line in the horizontal direction in the bit map font data, to not more than a predetermined number, by replacing one or some "0's" among the above more than predetermined number of successive "0's" with a "1"; and second step of magnifying the bit map font data for half density printing after the above replacement, in the horizontal direction at a predetermined magnification rate.

BRIEF DESCRIPTION OF THE DRAWING

In the drawings:

FIG. 1 shows an example of a method of multiplying each bit in each of the horizontal/vertical directions by each magnification rate;

FIG. 2 shows an example of bit map font data for a number 374" modified for the half density printing;

FIGS. 6, 7 and 8 show a examples of marks made by printed dots and not-printed dots respectively corresponding to different series of bit data, each under a common predetermined dimensional condition of the pitch of dots in the horizontal direction and the diameter of the mark printed by a dot data "1";

FIG. 10 shows a series of bit data in the horiztontal direction, sampled from the portion of the bit map font data shown by (A) in FIG. 2;

FIG. 16 shows a simulated printing result of the bit map data magnified in the horizontal direction at the magnification rate of three by the method of FIG. 11.

DESCRIPTION OF THE PREFERRED EMBODIMENTS

Figure 3:
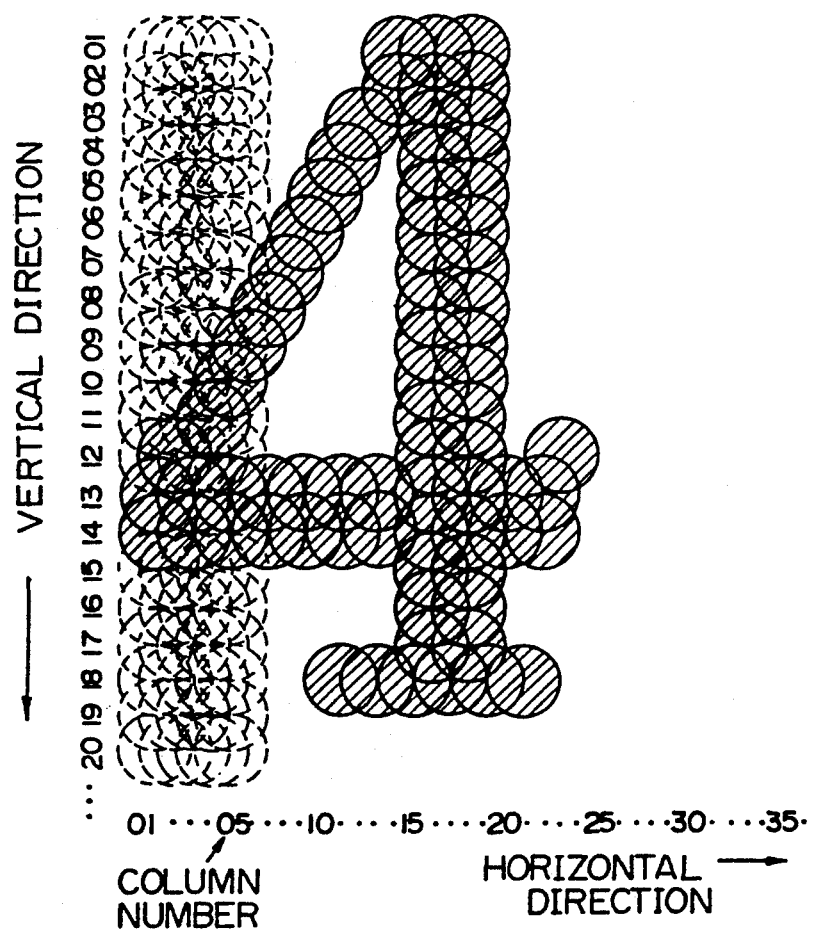
FIG. 3 shows a simulated printed result of the bit map font data of FIG. 2.
Figure 4:
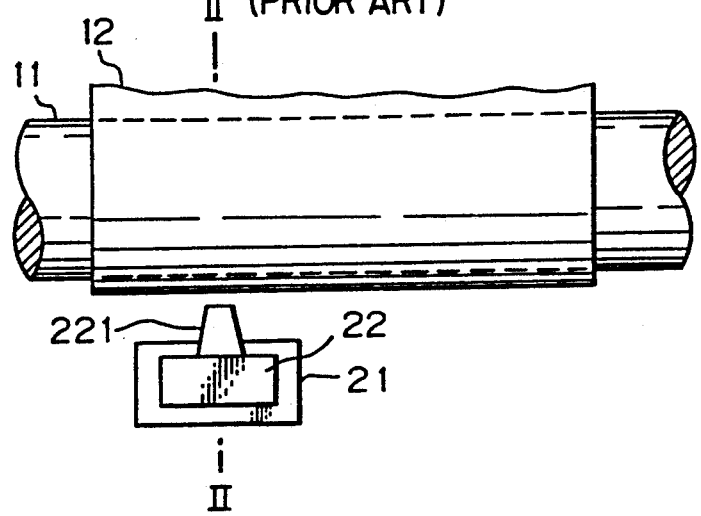
FIGS. 4 and 5 show an outline of the constrution of a dot matrix printer.
Figure 5:
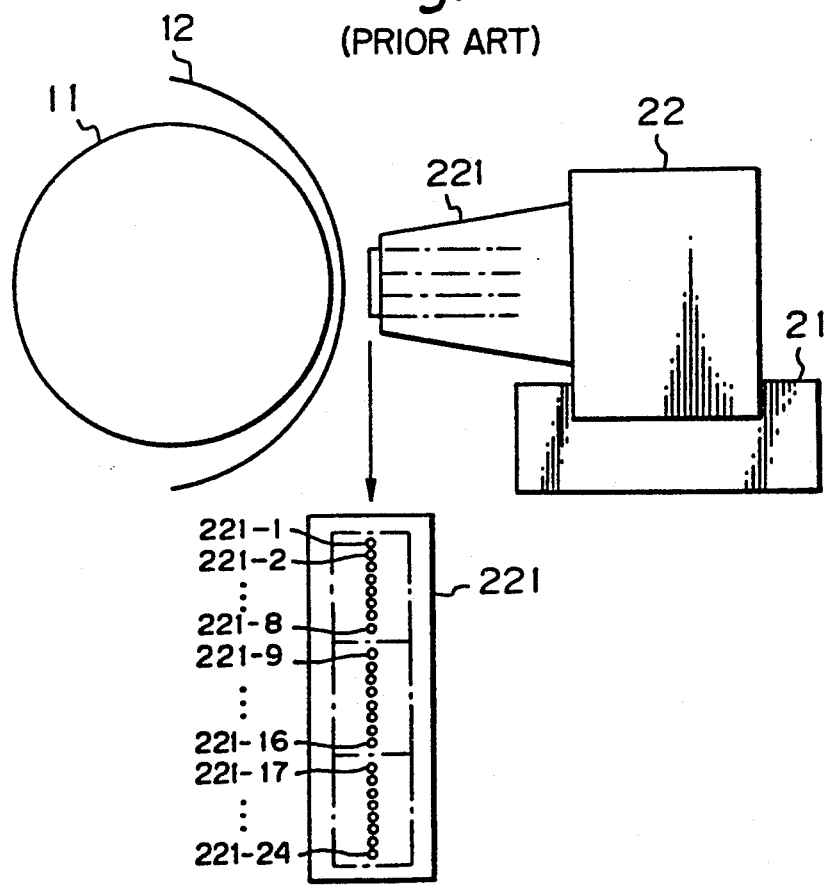

The first aspect of the present invention is a method of magnifying a bit map font data in a horizontal direction, which comprises: a first step of reducing the number of successive "0's" in a portion of the bit map font data (i.e., a specific series of orignal bit data); which represents a solid line in the horizontal direction, to not more than a first predetermined number, by replacing one or more "0's" of the successive "0's" of the aforesaid series, where the number thereof is more than the first predetermined number of successive "0's", with a "1"; and a second step of magnifying the bit map font data for half density printing after that the above replacement, in the horizontal direction at a predetermined magnification rate.

The above first predetermined number is determined as to its magnitude, or value such that, when more than that first predetermined number of successive "0's" appears in a series of orignial bit data, which series of original bit data should represent a solid line when printed, more than a second predetermined number of successive "0's" appears in the series of bit data which is generated by magnifying the above series of original bit data in the horizontal direction, wherein the appearance of more than the second predetermined number of successive "0's" in the magnified series of bit data, which should represent a magnified solid line when printed, instead produces a blank portioon within what should have represented a solid line when printed.

According to the first aspect of the present invention, more than a second predetermined number of successive "0's" does not appear in the portion, which should represent a magnified solid line when printed, if the magnified bit map font data. Therefore, the method of magnifying a bit map font data for half density printing in the horizontal direction, according to the present invention, enables the prevention of an appearance of a blank (a not-printed portion) in any portion of the bit map font data, which should represent a solid line when printed, after magnification in the horizontal direction.

In addition to the above, in a second aspect of the present invention, an additional step (third step) is added after the above second step in the first aspect of the present invention.

At the third step, a correction of a magnified bit map font data obtained by the second step so that a "1" is not followed by a "1" in the horizontal direction in a resultant bit map font data, is carried out, when a "1" is followed by another "1" in the above magnified bit map font data obtained by the above second step.

According to this additional third step, even if a "1" is followed by another "1" in the above magnified bit map font data obtained by the above second step, the successive "1's" are removed from the final result of the magnified bit map font data.

As mentioned later, by a predetermined magnification method, under a predetermined magnification rate (for example, when the magnification rate is an even integer), successive "1's" do not appear in the result of the above second step. Therefore, in this case, the above third step is not necessary.

Figure 11:
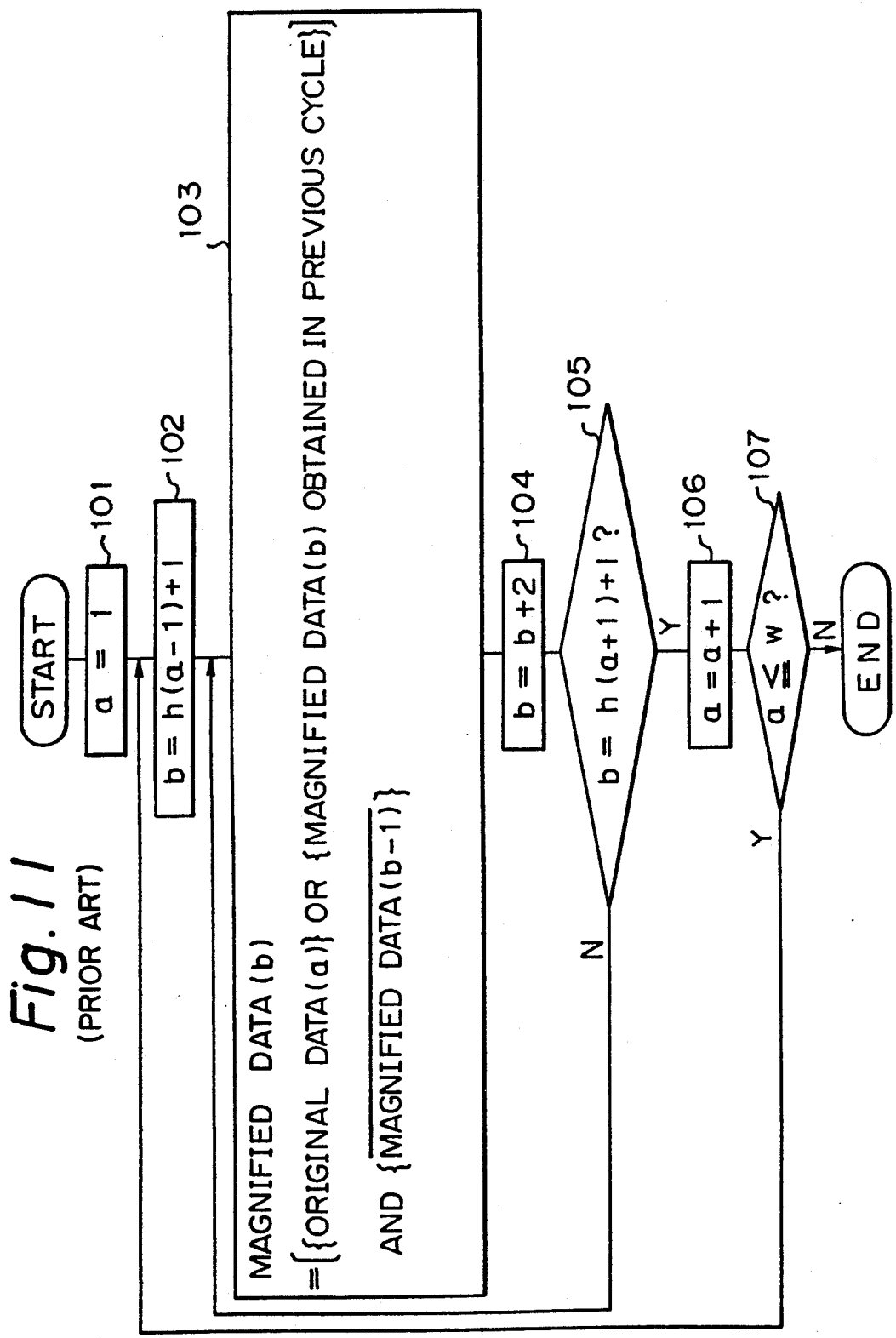
FIG. 11 shows an algorithm to obtain the value of each bit in the magnified bit data by the conventional method of magnifying a bit map font data for half density printing in the horizontal direction.
Figure 12:
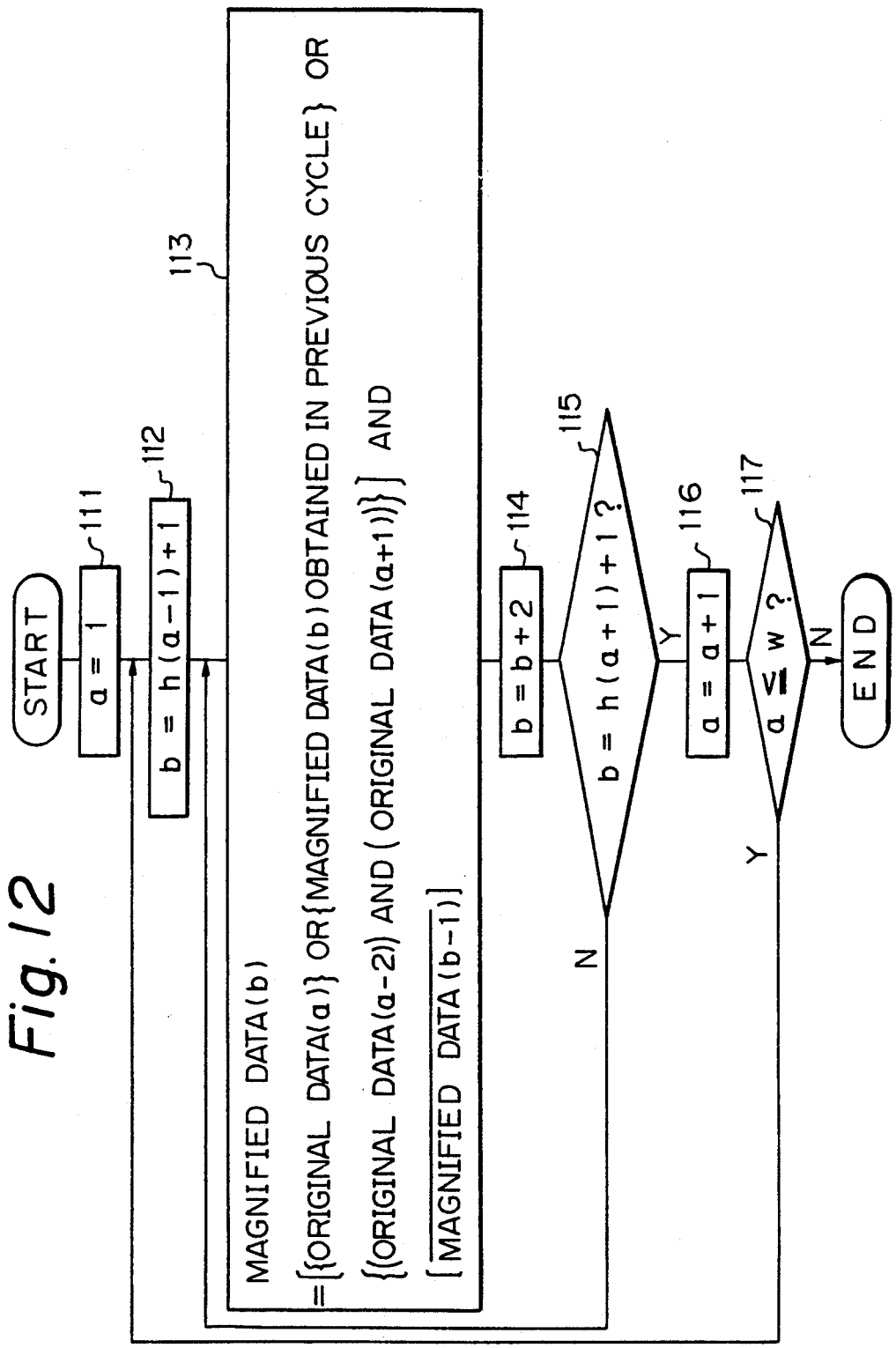
FIG. 12 shows an algorithm to obtain the value of each bit in the magnified bit data by the method of manifying a bit map font data for half density printing in the horizontal direction, as an embodiment of the present invention.

FIG. 12 shows a general algorithm used to obtain the value of each bit in the magnified series of bit data by the method of magnifying bit map font data for half density printing in the horizontal direction according to the present invention, which algorithm covers a detailed process of the magnification shown in FIG. 13 which is explained later. FIG. 12 corresponds in part to FIG. 11 which shows a general algorithm used in the prior art. Note the denotations of the parameters "a", "b", and "W" in FIG. 12 are the same as in FIG. 11.

At step 111 of FIG. 12, an initial setting of the column number of an original data is carried out as a=1.

At step 112 in FIG. 12, an initial setting of the column number of a magnified data is carried out as b=1.

At step 113 in FIG. 12, the basic equation for writing a magnified data, according to the present invention, is applied.

At step 114 of FIG. 12, the column number of the magnified data is incremented by two.

At step 115 of FIG. 12, it is determined whether or not the original data has been written h (the magnification rate, for example, of three) times.

At step 116 of FIG. 12, the column number of the original data is incremented.

At step 117 of FIG. 12, it is determined whether or not the column number of the original data is smaller than or equal to W.

The algorithm according to the present invention, is different from the conventional algorithm of FIG. 11, only in the basic equation for generating a magnified data at step 113, to obtain a value (b) of each column b in the magnified bit data. At step 113: a calculation of an AND logic of the value (a−2) of two columns before the corresponding column a in the original series of bit data, and the value (a+1) of the next column a+1 in the original series of bit data, is carried out; and then a calculation of an OR logic of the value (a) of the corresponding column a in the original series of bit data, the value (b) of the same column b obtained in the previous cycles, and the result of the above AND logic calculation, is carried out; and finally, a calculation of an AND logic of the result of the above OR logic calculation of each column b and the inverted value (b−1) of the one column before in the magnified bit map data, is carried out.

The above AND logic calculation carried out finally at step 113 means that a "1" dot should not be followed by a "1" dot, and this is the aforementioned successive "0's" inhibition rule in a series of bit data as the final result of the magnification, as in the case at step 103 of FIG. 11.

The above OR logic calculation at step 113, means that the magnified bit map data obtained in all cycles in the process of FIG. 12 must be superposed, as in the case at step 103 of FIG. 11. According to the present invention, however, at the step 113, the calculation result of the AND logic of the value (a−2) of two columns before the corresponding column a in the original series of bit data, and the value (a+1) of the next column a+1 in the original series of bit data is superposed in addition to the superposed data at the conventional step 103 in FIG. 11.

The above AND logic means that, when both the value (a−2) of two columns before the corresponding column a in the original series of bit data, and the value (a+1) of the next column a+1 in the original series of bit data, are "1", the value (a) of the column a is deemed "1" regardless of the actual value (a) of the column a, e.g., when the values (a−2, a−1, a, a+1) of the columns "a−2, a−1, a, a+1" in the original series of bit data are "1001", these are deemed "1011" before an operation of magnification by step 113 of FIG. 12. Therefore, this is an example of the realization of the aforementioned first step of the present invention for reducing the number of successive "0's" in the portion which represents a solid line in the horizontal direction in a bit map font data to not more than a first predetermined number, by replacing one or more "0's" among the more than the first predetermined number of successive "0's", with a "1".

Further, as readily understood by the above explanation, in the basic equation for generating a magnified data, according to the present invention at step 113 of FIG. 12, the combination of (a−2) and (a+1) can be replaced by a combination of (a−1) and (a+2).

More generally, to reduce the number of successive "0's" in the original series of bit data, by replacing one of the successive "0's" with a "1", —— assuming that n is the number of the successive "0's", and k is an arbitrary integer greater than zero and smaller than n, —— the value of the column with the column number a, must be replaced with the result of the AND logic calculation of the value (a−n+k) of n−k columns before the corresponding column a in the original series of bit data, and the value (a+k+1) of k+1 columns after the corresponding column a in the original series of bit data, and by repeating this process, a plurality of the successive "0's" can be replaced with "1".

Returning to the process of FIG. 12, similar to the steps in FIG. 11, at steps 112 to 115 in FIG. 12, the values (b)'s in alternate columns from the column number b=h (a−1)+1 to b=h(a+1)+1 in the magnified bit map data are obtained for each column (a) of the original data, and at steps 111 to 117, the values (b)'s in the magnified bit map data, corresponding to all columns (a) in the original bit map data, are obtained. Similar to the case in FIG. 11, in the process of FIG. 12, the values in the columns corresponding to the even-numbered columns in the aforementioned intermediate magnification-stage magnified elements, are not calculated, because these are always zero, and do not affect the result of the OR calculation.

Figure 13:
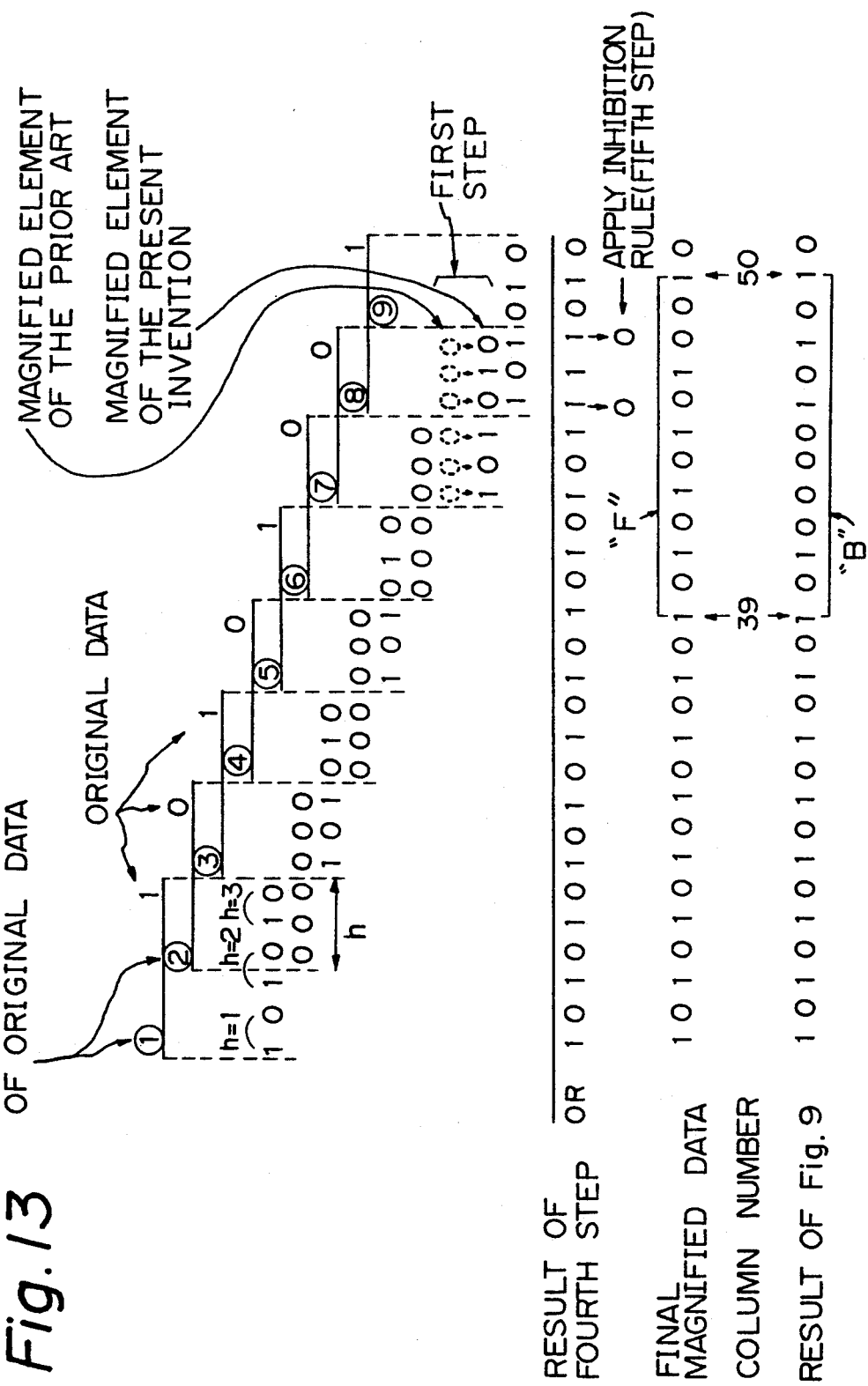
FIG. 13 shows an example of a detailed process of carrying out a method of manifying a bit map font data for half density printing in the horizontal direction at a magnification rate of three, realizing the algorithm of FIG. 12.

FIG. 13 shows an example of a detailed process of carrying out a method of magnifying a bit map font data for half density printing in the horizontal direction, realizing the algorithm of FIG. 12. FIG. 13 corresponds to FIG. 9 in the prior art, where the series of data (the original data) of FIG. 10 are again used as an original series of bit data, and the magnification rate h in the horizontal direction is also three, i.e., h=3.

Figure 9:
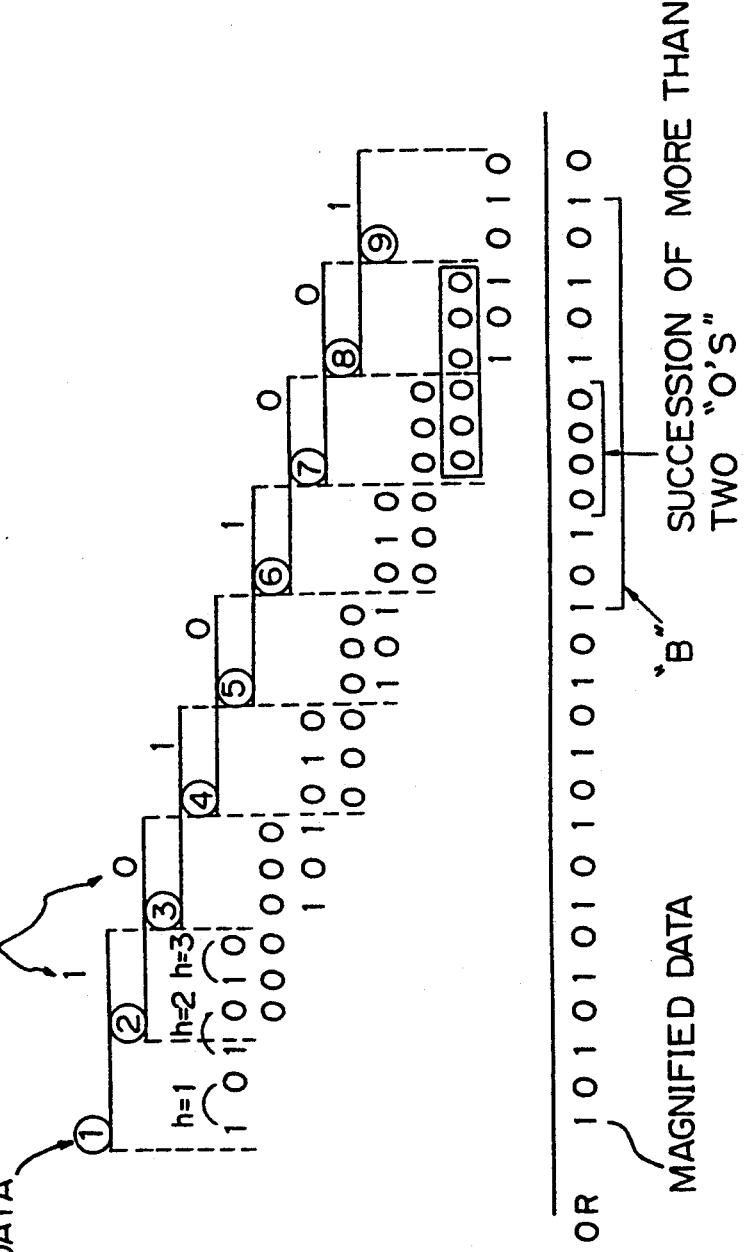
FIG. 9 shows an example of a detailed process of carrying out a conventional method of magnifying a bit map font data for half density printing in the horizontal direction at a magnification rate of three.

The process after the aforementioned process of reducing the number of successive "0's" in the original series of bit data, by replacing one of the successive "0's" with a "1", in the process of FIG. 13, can be understood as similar to the process of FIG. 9 explained before.

At the second step of FIG. 13, an intermediate-stage magnified element is generated from each bit of the series of the bit data obtained through the first step, as follows: a bit "1" in the series of data obtained through the first step generates h "10's" where h is a magnification rate; and a bit "0" generates h "00's", e.g., when the magnification rate is three, a bit "1" generates "101010"; and a bit "0" generates "000000".

At the third step, the positions of columns for the intermediate-stage magnified element for each of the above "1's" and "0's" are arranged in the order in which the "1's" and "0's" are arranged in the series of data obtained through the first step, and the positions of the two intermediate-stage magnified elements adjacent to each other are arranged with a difference of h columns.

At the fourth step, an OR logic is all bits in each of the columns, each of which bits is a component of the intermediate-stage magnified elements and the positions of which bits have been arranged at the above third step, is calculated.

In addition, at the fifth step, the aforementioned successive "1's" inhibition rule in the series of magnified bit data as a final result is applied to the resultant series of bit data obtained through the above fourth step. This step is necessary because successive "1's" might appear in the resultant series of bit data obtained through the above fourth step, e.g., "1111" shown in the example of FIG. 13.

However, successive "1's" in the resultant series of bit data obtained through the above fourth step can appear only when the magnification rate h is an odd number because, as mentioned before, the intermediate-stage magnified elements adjacent to each other are spaced by h columns, and therefore, when h is an even number, only odd-numbered columns can be "1" in the resultant series of bit data obtained through the above fourth step, i.e., successive "1's" do not appear in the resultant series of bit data obtained through the above fourth step. Thus, in this case, the above fifth step for applying the inhibition rule is not necessary.

Regarding the problem of an appearance of successive "0's" in the series of magnified bit data, for example, according to the process of FIG. 13, the series of data "1001" are changed to "1011", before carrying out the process at the above second to fourth steps, which is equivalent to the aforementioned process at the conventional first to third steps of FIG. 9, and therefore, the result of the magnified bit map data of FIG. 13 does not include more than two successive "0's". Under the aforementioned dimensional condition of the pitch of dots and the diameter of the printed dots, not more than two successive "0's" do not generate a blank portion in a portion which should represent a solid line when printed.

Generally, when replacing one "0" in successive "0's" in the original data with a "1", the aforementioned intermediate-stage magnified element corresponding to the replacement "1", consisting of a succession of "10's", is inserted, and the succession of "10's" breaks a succession of "0's" generated by the successive "0's" in the original data. Therefore, generally, the above first step can reduce the number of successive "0's" in the magnified series of bit data, and by a suitable selection of the columns to be replace, among the columns corresponding to the successive "0's" in the original data, generally the above first step can reduce the number of successive "0's" in the magnified series of bit data to not more than the (aforementioned second) predetermined number, where more than the second predetermined number of successive "0's" in the magnified series of bit data generates a visible blank portion, in a portion which should represent a solid line, when printed. Consequently, it is possible to effectively prevent an appearance of a visible blank portion in a solid line in the horizontal direction in a bit map font data for half density printing when magnified in the horizontal direction, and therefore, when a character constituted by a bit map font data for half density printing is magnified in the horizontal direction by the method of magnification according to the present invention, and printed, the original character style is maintained without any damage or defect due to an appearance of a blank portion in a solid line in the horizontal direction, which solid line is a part of the construction of the character.

Figure 14:
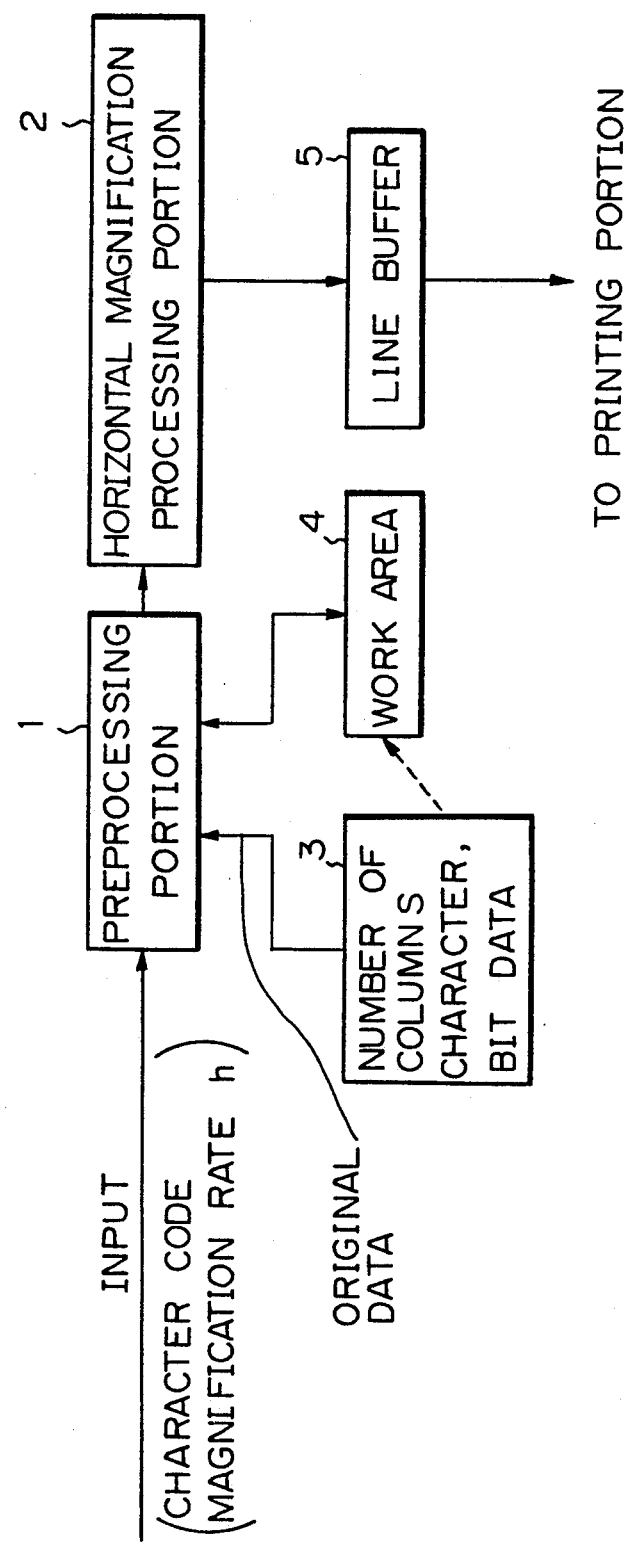
FIG. 14 shows the outlined construction of an example of the apparatus carrying out the method of magnifying a bit map font data for half density printing in the horizontal direction, according to the present invention.

FIG. 14 shows the outlined construction of an example of the apparatus for carrying out the method of magnifying a bit map font data for half density printing in the horizontal direction according to the present invention.

A preprocessing portion 1 in FIG. 14, which is realized by a computer unit as a concrete hardware construction, reads related data (number of columns of a character, bit data, etc.) from a CG data memory 3, based on a character code, for example, a number "4", a magnification rate h, for example, three, which are input thereto, and stores the bit data (font data) in a work area 4, and at the same time, sets the number of columns of a character W, and the magnification rate h=3, etc., in a constants registering area.

A horizontal magnification processing portion 2, which is also realized by a computer unit as a concrete hardware construction, magnifies a font data for half density printing in the horizontal direction and carries out the other processes.

A CG data memory 3 stores bit data corresponding to character codes (bit map font data for half density printing), number of columns of each of the characters, and the like.

A work area 4 is an area at which the bit data and the like are stored, and at which the processing mentioned before is carried out.

A line buffer 5 is used to store the bit data magnified in the horizontal (and also in the vertical) directions by the horizontal magnification processing portion 2. The magnified bit data are output therefrom one by one, and sent to a printing portion and printed.

The operation of the construction of FIG. 14 is as already explained with reference to FIGS. 1–13.

Figure 15:
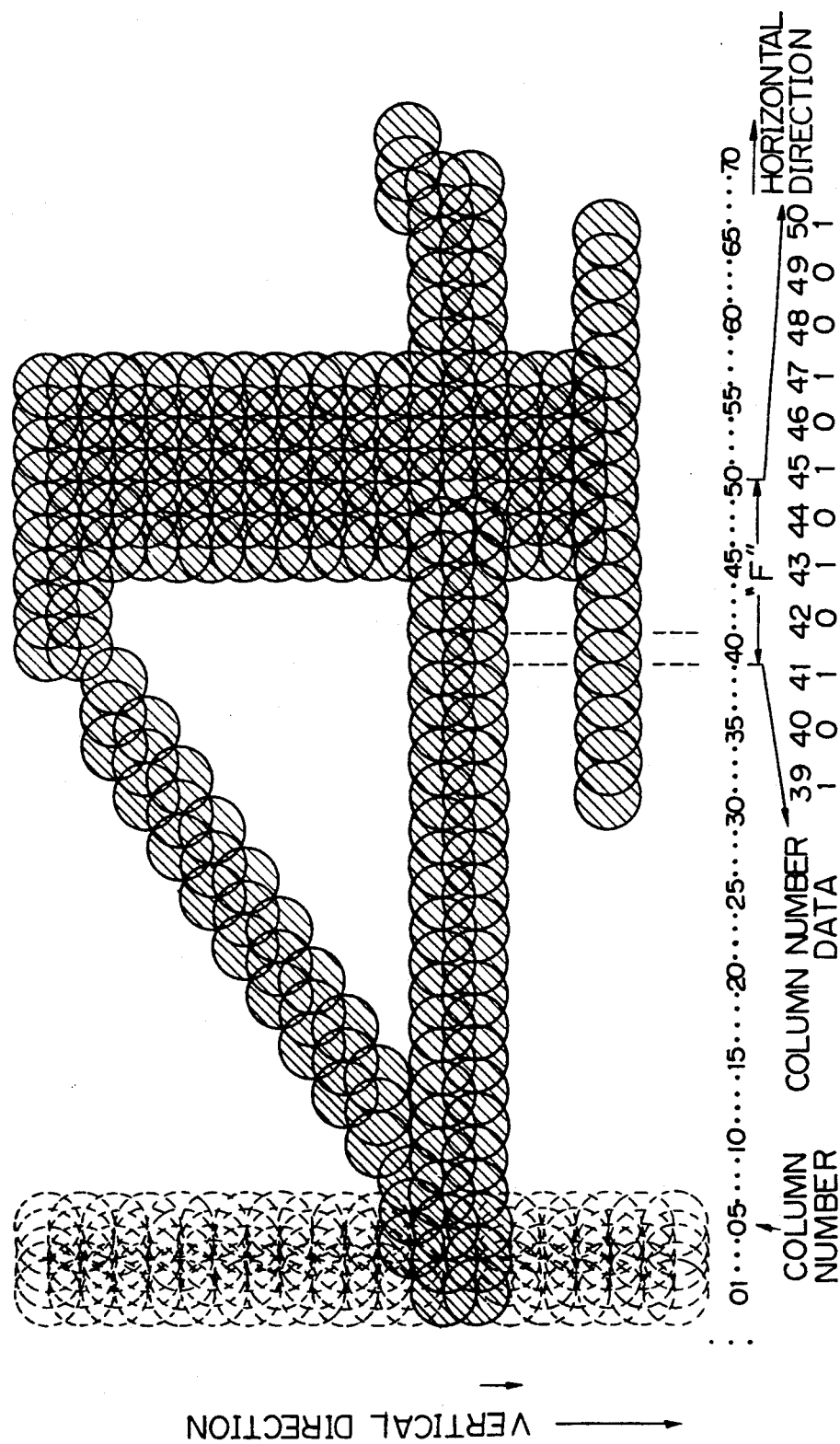
FIG. 15 shows a simulated printing result of the bit map data magnified in the horizontal direction at the magnification rate of three by the method of FIG. 12.

FIG. 15 shows an example of a simulated printing result of the bit map data magnified in the horizontal direction at the magnification rate three by the method of FIG. 12 (and FIG. 13), and FIG. 16 shows an example of a simulated printing result of the bit map data magnified in the horizontal direction at the magnification rate of three by the method of FIG. 11 (and FIG. 9). In both cases, the bit map font data of FIG. 2 is used as an original data, and the correspondence with a sampled series of resulting bit data indicated by "B" in FIG. 9 is shown in FIG. 16, and the correspondence with a sampled series of resulting bit data indicated by "F" in FIG. 13 is shown in FIG. 15.

As shown in FIG. 16, the simulated printing result of the bit map data magnified in the horizontal direction by the conventional method of FIG. 11 includes an obvious blank portion, which must be a part of a solid line in the horizontal direction, i.e., the character style magnified by the conventional method of FIG. 11, suffers obvious damage. However, as shown in FIG. 15, the simulated printing result of the bit map data magnified in the horizontal direction by the method according to the present invention of FIG. 12, includes no blank portion, and still maintains the original character style even after the magnification, which is evident when compared with the simulated printing result of the original bit map font data of Fig. 2 shown in FIG. 3.

I claim:

1. A method of processing original bit map font data for magnification, by a predetermined magnification factor in a horizontal direction, comprising:

a first, data preprocessing step of reducing the number of successive "0's" in a portion of the bit map font data, which portion represents a solid line in the horizontal direction and is to be magnified by the predetermined magnification factor, to not more than a first predetermined number, by replacing each of one or more of the "0's" in said portion with a "1" so that the resulting number of successive "0's" in said portion is not more than said first predetermined number of successive "0's", said first predetermined number being determined in accordance with limiting the number of successive "0's" in the corresponding, magnified portion of the magnified bit map font data to not more than a second predetermined number; and a second step of magnifying said bit map font data, after said replacement and the predetermined magnification factor, for half density printing in the horizontal direction, the second predetermined number being defined in accordance with avoiding the appearance of a blank segment in printing of the solid line in the horizontal direction, as represented by and in accordance with the corresponding, magnified portion of the magnified bit map font data.

2. The method of claim 1, further comprising:

a third step of correcting the magnified bit map font data produced by said second step so that successive "1's" are not present in the corresponding, magnified portion of the magnified bit map font data representing the solid line in the horizontal direction.

3. The method of claim 2, wherein said second step comprises:

a step of obtaining an intermediate-stage magnified element for each "1" in said portion, which represents a solid line in the horizontal direction, of said original bit map font data by generating "h" successive "10's" for each "1" in said portion of said original font data, where said "h" equals said predetermined magnification rate;

a step of obtaining an intermediate-stage magnified element for each "0" in said portion, which represents a solid line in the horizontal direction, of said original bit map font data by generating h successive "00's" for each "0" in said portion of said original bit map font data, where said h equals said predetermined magnification rate;

a step of arranging a position of columns for said intermediate-stage magnified element for said "1's" and "0's", in the order in which said "1's" and "0's" are arranged in said intermediate-stage magnified elements, adjacent to each other, are arranged with a difference of "h" columns; and a step of calculating an OR logic of all bit data in each of said columns, which bit data have been positioned at said arranging step.

* * * * *

UNITED STATES PATENT AND TRADEMARK OFFICE
CERTIFICATE OF CORRECTION

PATENT NO. : 5,062,724
DATED : November 5, 1991
INVENTOR(S) : Shinichi IIZUKA

It is certified that error appears in the above-identified patent and that said Letters Patent is hereby corrected as shown below:

Col. 1, line 42, change "anesthetic" to --aesthetic--.

Col. 2, line 43, change "sepped" to --speed--;
line 63, change "lengthes" to --lengths--.

Col. 3, line 29, change "dos" to --does--;
line 35, delete "to" (second occurrence);
line 68, after "00's," insert --e.g.,--.

Col. 4, line 25, change "and" to --an--.

Col. 5, line 3, change ""0's"" (second occurrence) to --"10's"--;
line 54, change "374"" to --"4"--;
line 59, delete "a".

Col. 6, line 36, delete ";";
line 43, delete "that";
line 47, after "value" insert --,--;
line 58, change "portioon" to --portion--;
line 64, change "if" to --of--.

UNITED STATES PATENT AND TRADEMARK OFFICE
CERTIFICATE OF CORRECTION

PATENT NO. : 5,062,724
DATED : November 5, 1991
INVENTOR(S) : Shinichi Iizuka

It is certified that error appears in the above-indentified patent and that said Letters Patent is hereby corrected as shown below:

Col. 10, line 10, change "replace" to --replaced--

Signed and Sealed this

Sixteenth Day of November, 1993

Attest:

BRUCE LEHMAN

*Attesting Officer*   *Commissioner of Patents and Trademarks*